Patented Aug. 12, 1930

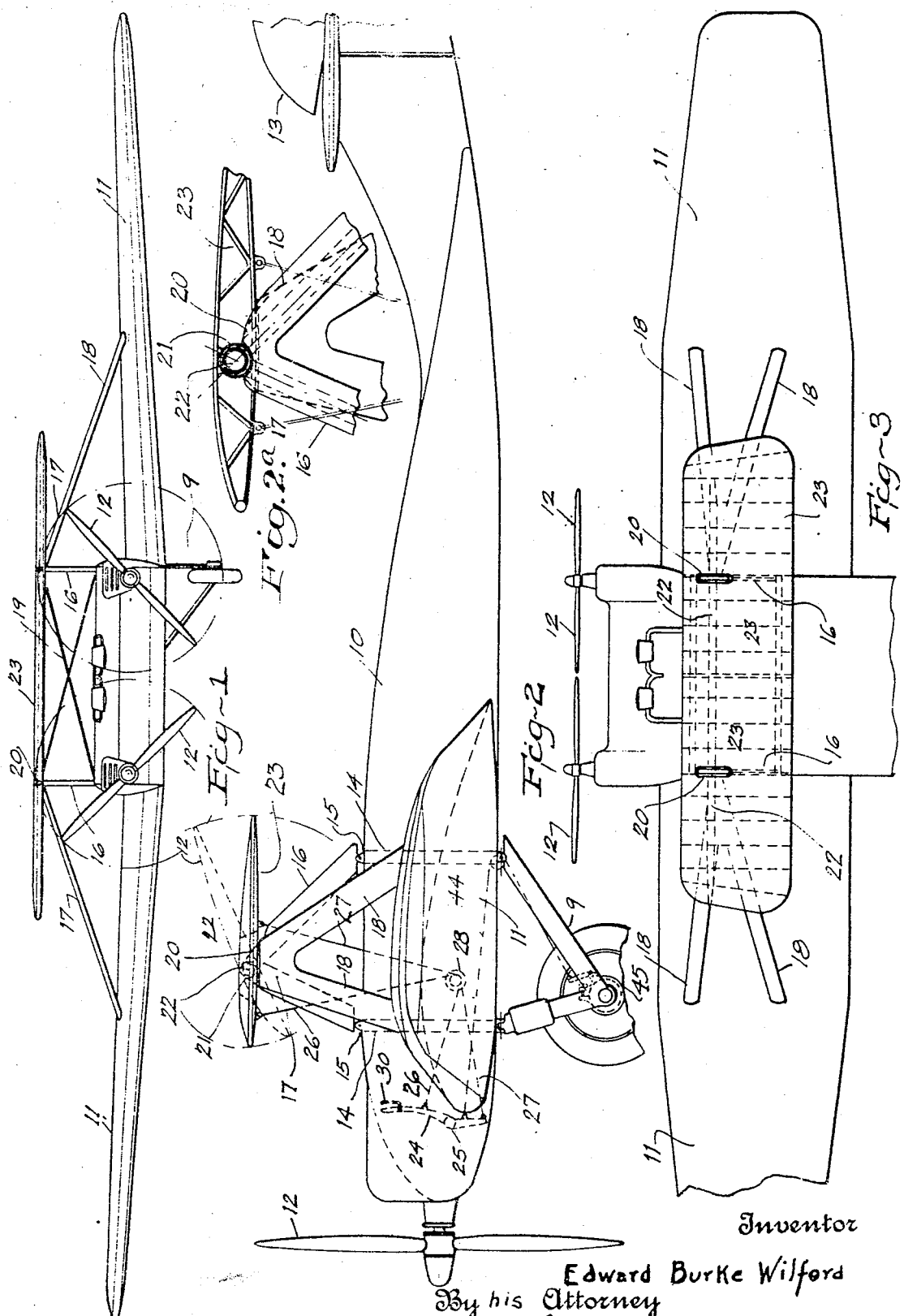

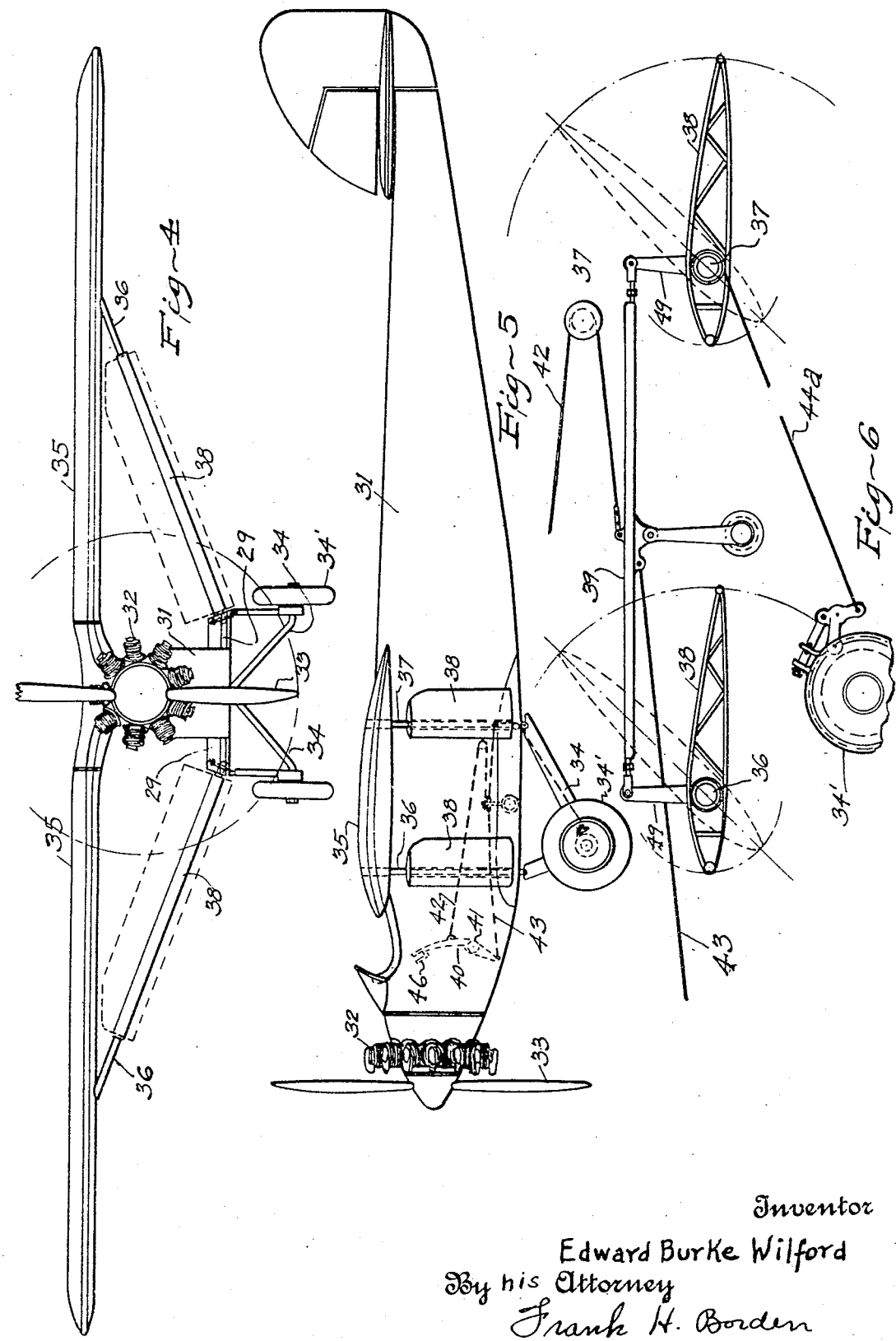

1,772,586

UNITED STATES PATENT OFFICE

EDWARD BURKE WILFORD, OF MERION, PENNSYLVANIA

AIRCRAFT

Application filed January 28, 1928. Serial No. 250,116.

This invention relates to aircraft, with particular reference to auxiliary airfoil surfaces thereof.

In my application #73,174, filed December 4, 1925, there was a disclosure of an airplane having pivotally mounted airfoil surfaces oscillatible on their pivots for certain purposes, including braking of the airplane. In my application #239,769, filed December 13, 1927, there was a disclosure of an auxiliary airfoil surface operable to nullify or eliminate the normal lift of the supporting airfoil so as to increase the traction of the landing gear wheels such as to render the brakes thereof effective, and to prevent "porpoising" on landing.

Among the objects of the present invention are; to improve the construction of aircraft and particularly of airplanes; to provide in an airplane supplemental or auxiliary airfoil surfaces for varying, either increasing or decreasing to the point of nullification, the normal lift of a supporting airfoil; to provide a monoplane with control surfaces spaced from the main airfoil; to provide a monoplane with struts that are streamlined by an adjustable airfoil forming an auxiliary lifting or control surface; to form supports for auxiliary airfoil control surfaces of structural strength; to provide as the support for a pivoted airfoil surface reinforcing elements of the airplane; to provide in an airplane means for effecting longitudinal stability without manipulating the control surfaces of the empenage; to provide auxiliary airfoil surfaces in an airplane to effect longitudinal stability according to variations in the load, and many other objects and advantages as will be more apparent as the description proceeds.

In the accompanying drawings:

Fig. 1, represents a front elevation of the fuselage and supporting airfoil of a "low wing" monoplane, with the auxiliary airfoil surface mounted in spaced relation to and above the fuselage, Fig. 2, represents a side elevation of the same to show the structural formation, and indicating in dotted lines mechanism for actuating the auxiliary surface, and for actuating the brake on the wheel of the landing gear, Fig. 2ᵃ, represents a fragmentary detail of the support for the auxiliary surface, partially in section, Fig. 3, represents a top plan of the device shown in Figs. 1 and 2, to indicate the disposition of the auxiliary airfoil surface relatively to the main airfoil and fuselage, Fig. 4, represents a front elevation of a "high wing" monoplane, as a modification of the previous disclosure, with the semi-cantilever wings supported on struts forming the centers of rotation of auxiliary control airfoil surfaces, the adjusted position being indicated in dotted lines, Fig. 5, represents a side elevation of the same, with the actuating mechanism indicated in dotted lines, and Fig. 6, represents a section through the struts of Fig. 4, showing two of the possible adjusted positions of the airfoil surfaces thereof in dotted and full lines, and with the preferred actuating mechanism shown in plan.

In a preferred embodiment of the invention the fuselage 10, of the wide "Burnelli" type, as shown in Figs. 1, 2 and 3, has the main wing of the airplane extending laterally from its lower portion in the form of oppositely disposed airfoils 11, to form the airplane known as a "low wing" monoplane. The airplane thus disclosed is provided with power sources connected with propellers 12, of which there may be one or more, and the customary control surfaces in the main airfoil, and in the empenage 13. It will be clear that the airplane of this invention will be provided with suitable landing gear according to the medium from which it is to be flown, either a landing gear 9, or pontoons (not shown).

The fuselage, at desired points, as for instance adjacent the cock-pit, is provided with vertical structural members 14, trussed and built into the structure, shown in dotted lines in Fig. 2, terminating just above the surface of the fuselage in eyes or couplings 15, there being a pair of properly trussed members 14 on each side of the fuselage. To a pair of eyes 15 on each side of the fuselage, the streamlined strut member 16 is attached. Each strut member is in the shape of an inverted V and extends vertically with the legs thereof rigidly attached to the eyes of the vertical members 14, so as to be resistant rigidly to fore and aft strains and stresses. Joined to the apex of each of the strut elements at 20, is a bifurcated wing strut 17, of generally inverted V shape, the legs 18 of which extend outwardly and downwardly to rigid connection and engagement with the main spars of the airfoils 11, to form strengthening members for the airfoils, as well as for the vertical strut members 16. Suitable guide wires 19 may be disposed between the two vertical strut members, as will be clear.

The vertical and inclined struts on each side are joined at their apex at 20, having journals 21 within which an axle 22 is disposed, and upon which latter the auxiliary airfoil element 23 is mounted for movement with the axle. It is obvious that the axle may be rigidly anchored to the struts and the auxiliary element may be mounted on journals rotating on the axle. It is preferred that the auxiliary surface which is of airfoil section and contour be pivoted substantially at, or just in front of, the center of pressure thereof so that movement of the surface will be against small resistance. It is preferred that vertical openings be provided in the auxiliary surface in which the apex of the joint strut is received, to permit a wide range of pivotal movement of the control surface on its axis. The axle 22 is preferably provided with suitable thrust members so that it may serve as a compression member to absorb compression strains transmitted from the airfoils through the wing struts. This assembly, from a strong, structural view-point, is of value even without the auxiliary control airfoil with its advantages, especially in the construction of monoplanes of the "low wing" type.

Within the fuselage, preferably, a control lever 24 is pivotally mounted, as at 25, to which cables 26 and 27 are affixed on opposite sides of the pivot, extending over a pulley 28 appropriately disposed relative the control surface, to attachment on the auxiliary control surface at points on opposite sides of the axis of said surface. To the control lever a brake cable 44 may be connected, passing over suitable pulleys, and extending to a wheel brake 45 on the landing gear, and operable after a predetermined movement of the control lever, to apply the brake. In this connection the lever 24, which is preferably a hand lever as shown, but may be operated otherwise if desired, may be provided with a hand grip or similar device 30, to operate any desired sort of release mechanism to extend the range of movements of the lever beyond that normally used for stabilizing purposes. This will be further explained but it is to be noted that such wider range of movement of the auxiliary control airfoil or surface may be accompanied by actuation of a brake on the wheel of the landing gear.

In the modified form of the invention shown in Figs. 4 and 5, the fuselage 31 carries a motor 32, propeller 33, and a landing gear 34, which as previously noted may be a wheeled landing gear as shown, or pontoons, (not shown). From the upper level of the fuselage 31, the main airfoil or wing 35 extends laterally from each side thereof, to form a "high wing" monoplane, with reinforcing struts extending from the main spars in the airfoil to strut roots 29 extending from the lower edge of the fuselage, and to which the landing gear is attached. Each strut root 29 comprises a streamlined narrow box or compartment having structural strength and being in communication with the interior of the fuselage. The struts supporting the wings, comprise front struts 36 and rear struts 37, extending in substantially parallel though spaced relation. Each strut forms a support for an oscillatable airfoil section 38, susceptible to pivotal movement on the strut. The operating mechanism for the auxiliary control surfaces disposed on the struts may be of any available sort. It is preferred that a hand or other lever 40, pivoted at 41 be connected by cables 42 and 43 to links 39 disposed for reciprocation in each strut root 29, and pivotally engaged with lever arms 49 connected to each section or auxiliary control surface 38 for oscillating same upon the manipulation thereof. A supplemental cable 44ª connection may be connected to a drum or similar reel element of one lever arm 49 to a brake 34' on the landing gear wheel. A grip or other escapement element 46 may be provided on the lever 40 enabling exaggerated movements of the auxiliary control airfoils during which the the brakes may be energized in synchronism with the exaggerated airfoil control surface movement.

It will be understood that the structures shown in Figs. 4, 5, and 6 may be used for lateral control and stabilization if desired, by proper coupling of the control mechanisms so that the control surfaces 38 may swing in opposite directions on opposite sides of the fuselage, either as auxiliary or as main ailerons, and such use is contemplated. However the primary purpose of the auxiliary control surfaces in either of the illustrative forms disclosed herein, is as a longitudinal stabilizing means, by variations in the effective lift of the main airfoils, and as a means for varying the effective lift of the airplane without varying the angle of attack of the airplane.

The device shown in Figs. 1, 2 and 3, comprises the auxiliary control surface or airfoil pivotally mounted above the fuselage, substantially at its center of pressure, for ease of control, and with its pivotal point or axis substantially vertically aligned with the center of pressure of the main airfoil. The entire auxiliary surface being within the extended limits or boundaries of the main airfoil, and with the tip ends thereof extended well out over the airfoil extending from the fuselage. In certain aspects of the invention it is of importance to note that a large part of the auxiliary airfoil of either form of the invention lies in the slip stream from the propeller, and therefore possesses a magnified responsiveness when the motor or motors have appreciable speed.

In flying it is frequently undesirable to assume extreme angles of attack to achieve certain lifting effects or rate of climb, as it might be desirable to maintain a substantially even angle of attack and a stabilized keel, owing to the nature of freight carried, etc., and in any case such extreme angles are undesirable, and should be avoided. Although the most efficient flying angle is predetermined in the rigging of the airplane, yet as the conditions as to weight carried, and speed desired, vary, so does the rate of climb and the rate of speed attained. It is in view of the variations entering into the problem that the auxiliary control surface is most important.

Assuming that with the control lever adjustable normally to swing the auxiliary control surface from +15° to −15°, the pilot will normally set it at 0°, and assume a normal angle of attack, with the control surfaces of the empenage, of perhaps 2°, as an instance. If the aircraft is heavily laden, and additional lift is necessary, it is necessary, according to the old practice, to drop the tail and elevate the nose to an extent sufficient to increase the angle of attack to perhaps 10°, in order to secure the maximum lift. This increase in the angle of attack reduces the speed, and is not an efficient flying angle owing to the excessive drag, and moreover places the entire airplane at an angle to the horizontal that may be uncomfortable and undesirable according to circumstances. With the invention disclosed herein, the normal angle of attack stated is maintained, but the auxiliary control surface is swung to a desired angle, such as 15° or more, and while still maintaining an efficient flying angle as regards the main body of the airplane, has an appreciably enhanced lift incident to the change in angle of the control surface. In case the load is lighter than normal for the craft, when an exaggerated lift is achieved at the normal flying angle, and which normally is counteracted by elevating the tail and depressing the nose so that a minus angle of attack is had, the pilot maintains his normal flying angle, but varies the angular disposition of the auxiliary control surface to a negative angle, even as far as −15° or more, and the excess lift of the main airfoils is nullified or overbalanced by the pressure on the auxiliary control surface, and efficient flying angles are maintained.

It will be clear that the efficient flying angles are maintained regardless of the condition of the airplane as to load, and that the auxiliary surfaces are therefore effective to secure longitudinal stability.

It is pointed out further, that the auxiliary control surfaces of this invention are so designed that when desired, as upon landing, or at any time in flight that it may be deemed expedient, the control surfaces may be swung to extreme angles, even to such angles as 60° or more, in which position their main resultant is drag and a downward thrust, quite nullifying the normal lift of the supporting airfoils. This is particularly advantageous in effecting a landing, inasmuch as the brakes on the landing gear can only be effective if there is sufficient traction on the wheels to prevent slipping of the wheels on the ground, or of the pontoons relative the water. By swinging the auxiliary surfaces in such position as to nullify the lift of the airfoils and to impart a downward thrust on the landing gear, whether wheeled or pontoon, such traction is had as will enable the frictional resistance to movement to be such as to retard and stop the airplane with a minimum run. This is thought to be clear, as is the fact that this invention applies to an auxiliary airfoil surface, or to the rotation of a wing section or section thereof, enabling the rotated section to act as a stabilizer, air brake, and traction producer.

It is within the purview of the invention to mount the auxiliary surface between the wings of a biplane, and to pivot it in the same manner, either with or without mechanical brakes, to act as a longitudinal stabilizer by varying the lift in proportion to the load while in flight, and as an airbrake and traction producer during the landing run through nullification of the lift, within the limitations of the appended claims.

I claim:

1. In an airplane, a fuselage, a main airfoil mounted on the fuselage, vertical struts mounted on the fuselage, inclined struts extending between the vertical struts and the main airfoil, each strut comprising an inverted V the legs of which are anchored to the airfoil intermediate its ends and the fuselage, and a lateral member extending between the vertical struts to absorb the compression strains transmitted from the main airfoil through the inclined struts.

2. In an airplane, a fuselage, a main airfoil carried by the fuselage, vertical struts mounted on the fuselage inclined struts extending between the vertical struts and the main airfoil, each strut comprising an inverted V the legs of which are anchored to the airfoil intermediate its ends and the fuselage, a lateral member extending between the vertical struts to absorb compression strains transmitted through the inclined struts, a control surface mounted above the fuselage on said member.

3. In an airplane, an airfoil, a body portion to which the airfoil is attached, structural elements disposed in the body portion, extensions thereof extending above the surface thereof, strut elements mounted on the extensions and braced thereon against fore and aft strains, inclined struts connecting the strut elements and the airfoil bracing the elements against lateral strains in one direction, and means extending between the strut elements maintaining them in spaced relation to prevent lateral movement in the other direction.

In testimony whereof I affix my signature.

EDWARD BURKE WILFORD.